United States Patent
Zhou et al.

(10) Patent No.: US 8,924,846 B2
(45) Date of Patent: Dec. 30, 2014

(54) APPARATUS AND METHOD FOR TEXT EXTRACTION

(75) Inventors: Bao-Yao Zhou, Beijing (CN); Yuhong Xiong, Mountain View, CA (US); Wei Liu, Beijing (CN)

(73) Assignee: Hewlett-Packard Development Company, L.P., Houston, TX (US)

( * ) Notice: Subject to any disclaimer, the term of this patent is extended or adjusted under 35 U.S.C. 154(b) by 98 days.

(21) Appl. No.: 13/258,464

(22) PCT Filed: Jul. 3, 2009

(86) PCT No.: PCT/CN2009/072606
§ 371 (c)(1),
(2), (4) Date: Nov. 23, 2011

(87) PCT Pub. No.: WO2011/000165
PCT Pub. Date: Jan. 6, 2011

(65) Prior Publication Data
US 2012/0066587 A1    Mar. 15, 2012

(51) Int. Cl.
*G06F 17/22* (2006.01)
(52) U.S. Cl.
CPC .................................. *G06F 17/2241* (2013.01)
USPC ............ 715/234; 715/253; 715/254; 715/267
(58) Field of Classification Search
USPC ......... 715/200, 201, 202, 205, 206, 234, 700, 715/760, 255, 256, 267, 272, 273
See application file for complete search history.

(56) References Cited

U.S. PATENT DOCUMENTS

| | | | |
|---|---|---|---|
| 6,510,441 B1 * | 1/2003 | Kenninga | 715/234 |
| 7,111,000 B2 * | 9/2006 | Wen et al. | 707/749 |
| 8,196,036 B2 * | 6/2012 | Huang et al. | 715/239 |
| 8,250,464 B2 * | 8/2012 | Dang et al. | 715/234 |
| 8,321,396 B2 * | 11/2012 | Dill et al. | 707/706 |
| 8,392,820 B2 * | 3/2013 | Tsai et al. | 715/229 |
| 2002/0078105 A1 * | 6/2002 | Hamada et al. | 707/530 |
| 2003/0192011 A1 * | 10/2003 | Williamson et al. | 715/525 |
| 2004/0133557 A1 * | 7/2004 | Wen et al. | 707/3 |
| 2005/0050086 A1 * | 3/2005 | Liu et al. | 707/102 |
| 2005/0071328 A1 * | 3/2005 | Lawrence | 707/3 |
| 2008/0010583 A1 * | 1/2008 | Lee | 715/200 |
| 2008/0201633 A1 * | 8/2008 | Huang et al. | 715/239 |
| 2008/0282149 A1 * | 11/2008 | Williamson et al. | 715/251 |
| 2008/0306941 A1 * | 12/2008 | Dill et al. | 707/5 |
| 2010/0146381 A1 * | 6/2010 | Tsai et al. | 715/234 |

FOREIGN PATENT DOCUMENTS

| | | |
|---|---|---|
| CN | 101329665 | 12/2008 |
| CN | 101334789 | 12/2008 |
| CN | 101346715 | 1/2009 |

* cited by examiner

*Primary Examiner* — Maikhanh Nguyen

(57) ABSTRACT

A method of determining main text in a mark-up document is provided, which comprises determining a length of each paragraph in the mark-up document; and determining one or more main paragraphs of the mark-up document based upon the length of the paragraphs in the mark-up document.

21 Claims, 12 Drawing Sheets

APPARATUS AND METHOD FOR TEXT EXTRACTION

CROSS-REFERENCE TO RELATED APPLICATION

This application is a national stage application under 35 U.S.C. §371 of PCT/CN2009/072606, filed Jul. 3, 2009.

BACKGROUND

It is sometimes desired to extract text from a mark-up document. However, a problem arises in that it is difficult to distinguish meaningful or desired text from extraneous text frequently contained in the mark-up documents.

For example, it may be desired to extract text from a web page, wherein the meaningful text of the web page is the main text of the web page and the extraneous text of the web page is text forming one or more accompanying advertisements, decorations, navigation information, a header or footer of the web page etc.

It is an object of embodiments of the invention to at least mitigate one or more of the problems of the prior art.

BRIEF DESCRIPTION OF THE DRAWINGS

Embodiments of the invention will now be described by way of example only, with reference to the accompanying figures, in which.

DETAILED DESCRIPTION OF EMBODIMENTS OF THE INVENTION

Figure 1:
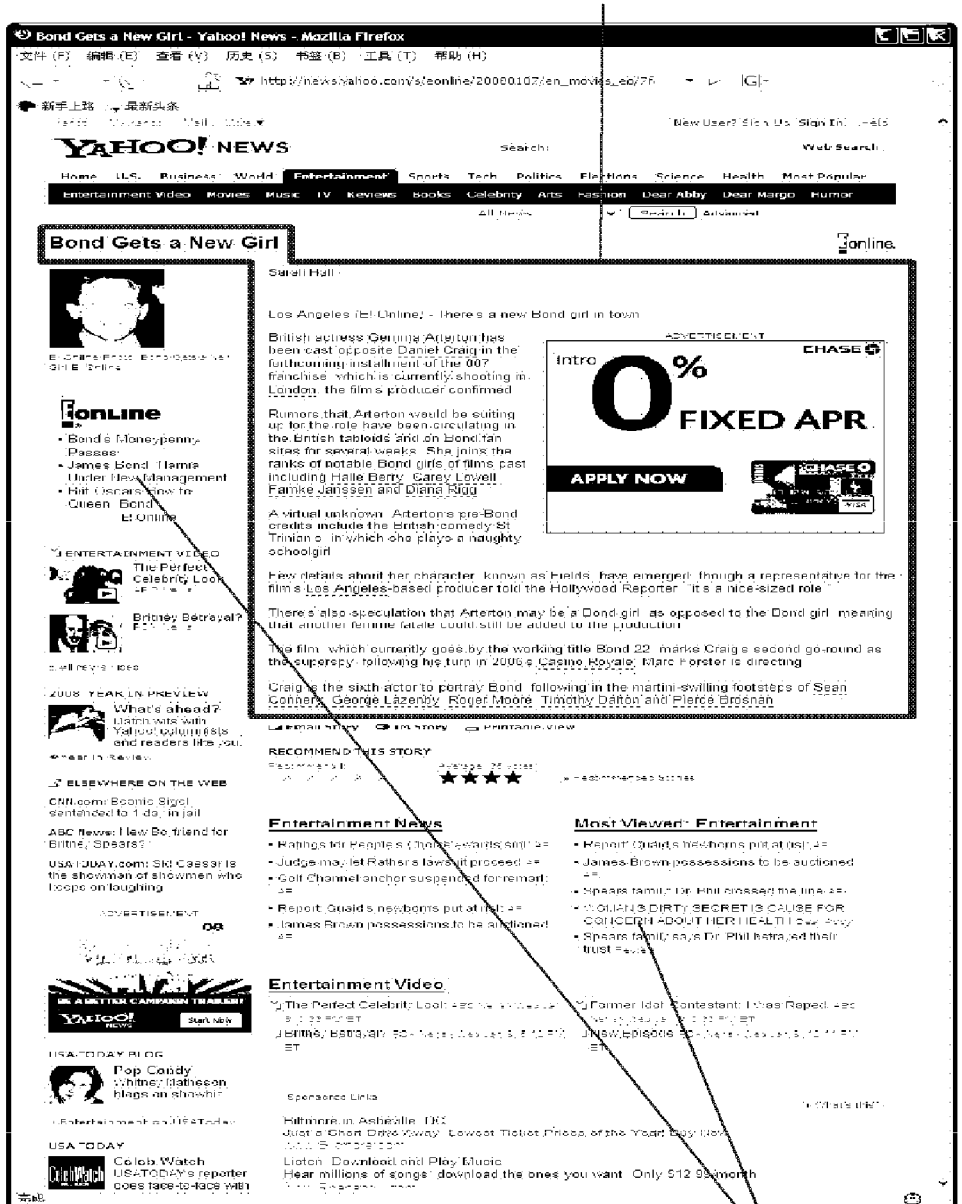
FIG. 1 is an illustration of a web page displayed in a browser application.

FIG. 1 shows a mark-up document 100, in the form of a web page, which is displayed in a browser application capable of interpreting mark-up instructions or tags contained in the mark-up document 100. The mark-up instructions format and control the display of text contained in, or imported to, the mark-up document 100 and import graphical items e.g. pictures for display alongside the text. Frequently a mark-up document such as a web page includes main text and other text displayed alongside or around the main text. The main text 110 and the other text 120 of the web page are indicated in FIG. 1. The main text 110 is text which represents the desired or intended content of the mark-up document 100, whereas the other text 120 is additional text, such as advertisements, menu items and the like.

Figure 2:
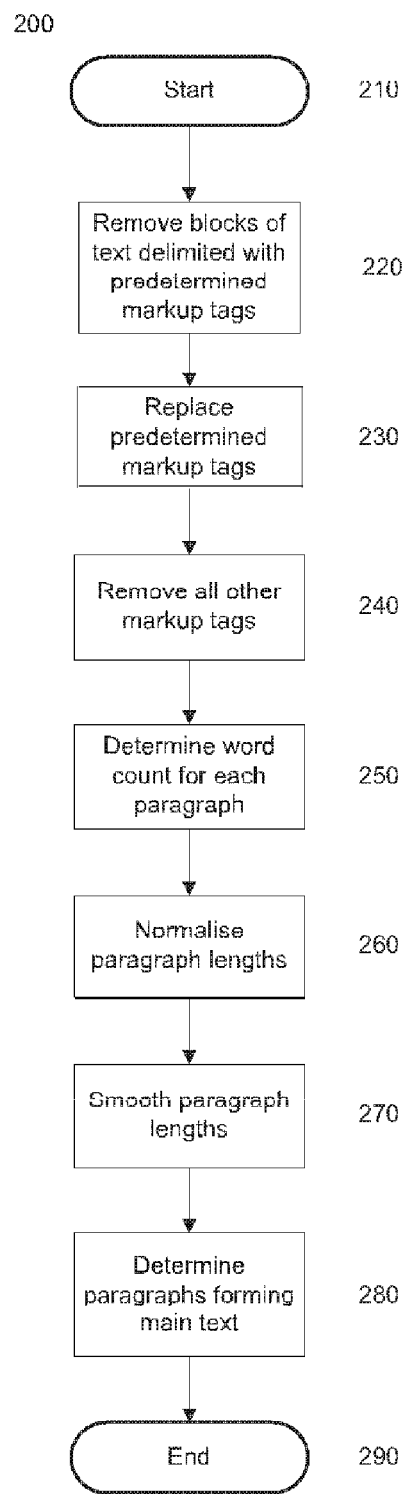
FIG. 2 is an illustration of a method according to an embodiment of the invention.

The presence of the other text 120 in the mark-up document 100 often makes it difficult to extract the main text 110 i.e. it is difficult to automatically distinguish the main text 110 and the other text 120. Embodiments of the present invention provide a method and apparatus for automatically identifying and extracting the main text 110 of a mark-up document 100, such as the main text 110 of a web page, which is an example of a mark-up document containing mark-up instructions in the form of HTML tags FIG. 2 illustrates a method 200 for determining the main text 110 within the mark-up document 100 according to an embodiment of the invention which starts with step 210.

In step 220, blocks of text delimited with predetermined mark-up tags such as HMTL tags <!-- -->, <HEAD>, <SCRIPT>, etc are deleted or removed from the mark-up document 100. That is, text between predetermined pairs of mark-up tags is deleted. In some embodiments of step 220 all carriage returns (CR) or line breaks are also removed from the document, such that the document effectively contains a single paragraph of text.

In step 230 one or more predetermined mark-up tags in the mark-up document 100 are replaced with carriage returns (CR) or line breaks. In particular, in step 230 block-level mark-up tags such as HTML tags <DIV>, <H1>-<H6>, <HR>, <OL>, <UL>, <LI>, <P>, <TD>, <TR>, <TABLE>etc. are replaced with carriage returns (CR). This has the effect of dividing sections of the mark-up document 100 separated with the block-level tags into blocks or paragraphs of text separated by line breaks.

Figure 3:
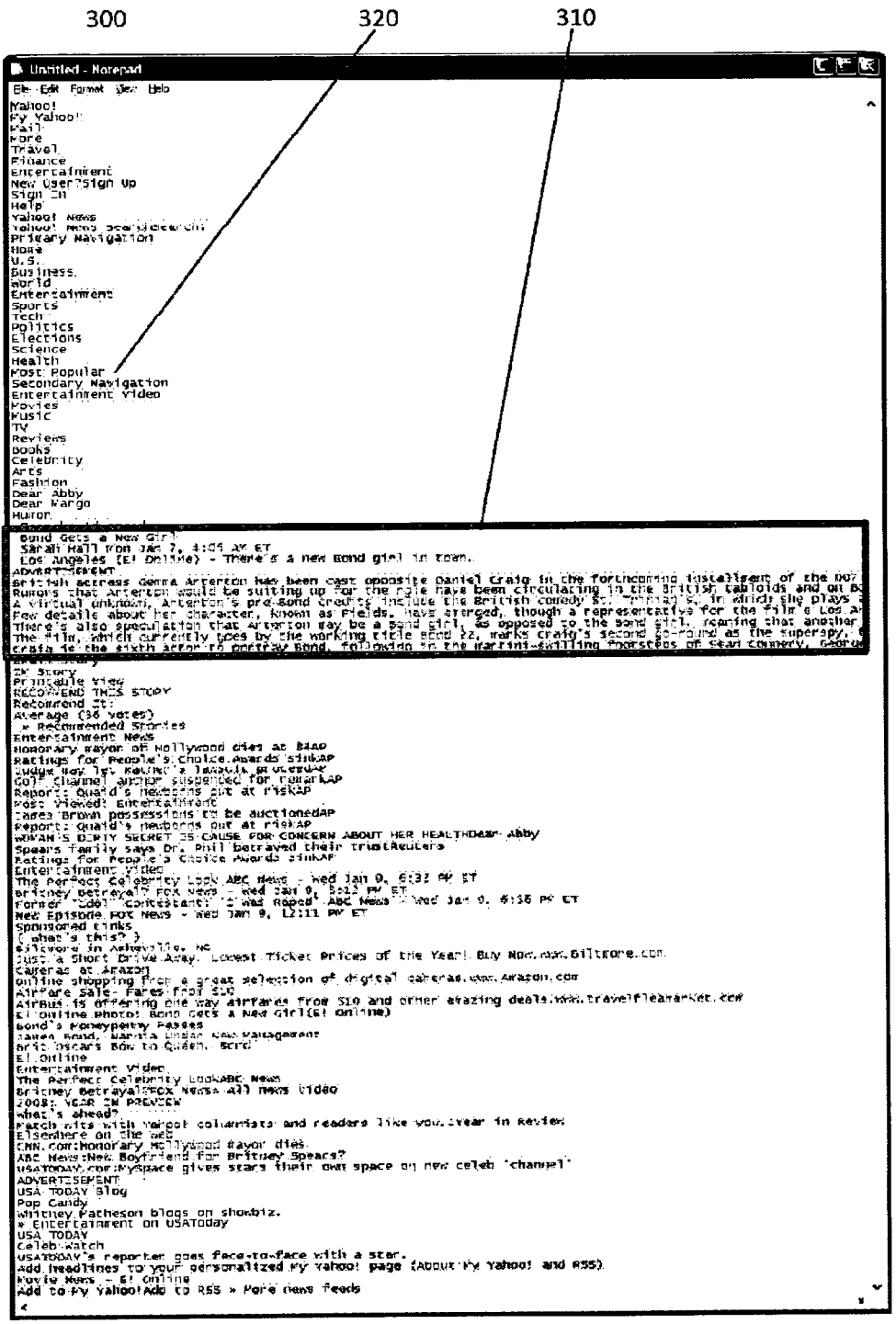
FIG. 3 is an illustration of text in the web page.

In step 240 the remaining mark-up tags in the mark-up document 100 are removed, such that the document only contains text and carriage return characters. That is, the document contains one or more paragraphs of text separated by carriage returns. Further, extraneous whitespace e.g. multiple blank lines etc. are removed from the document. As a result, the document contains a series of text paragraphs separated by carriage return characters. FIG. 3 is an illustration of the document derived from that shown in FIG. 1 following the above-described steps. The document contains 135 paragraphs of between 1 and 46 words in length. The main text 310 is indicated in FIG. 3, although it will be realised that the document does not contain any indication of the main text paragraphs, and forms paragraphs 40 to 50 of the document. However, the main text 310 is surrounded by paragraphs of other text 320 from which it is required to distinguish the main text 310. Whilst the embodiment of the invention is being described with reference to an example which contains one section of main text 310, it will be realised that the document may contain two or more separate sections of main text 310.

In step 250, a word count is determined for each paragraph in the document. The word count represents the number of words in each paragraph. The word count is determined for all paragraphs, that is for both the main text 320 and other text 320, since the location and extent of the main text 310 within the document has not yet been determined. The document P is represented as an ordered set of N paragraphs, as in Equation 1:

$$P = \{p_1, p_2, \ldots, p_N\} \qquad \text{Equation 1}$$

Figure 4:
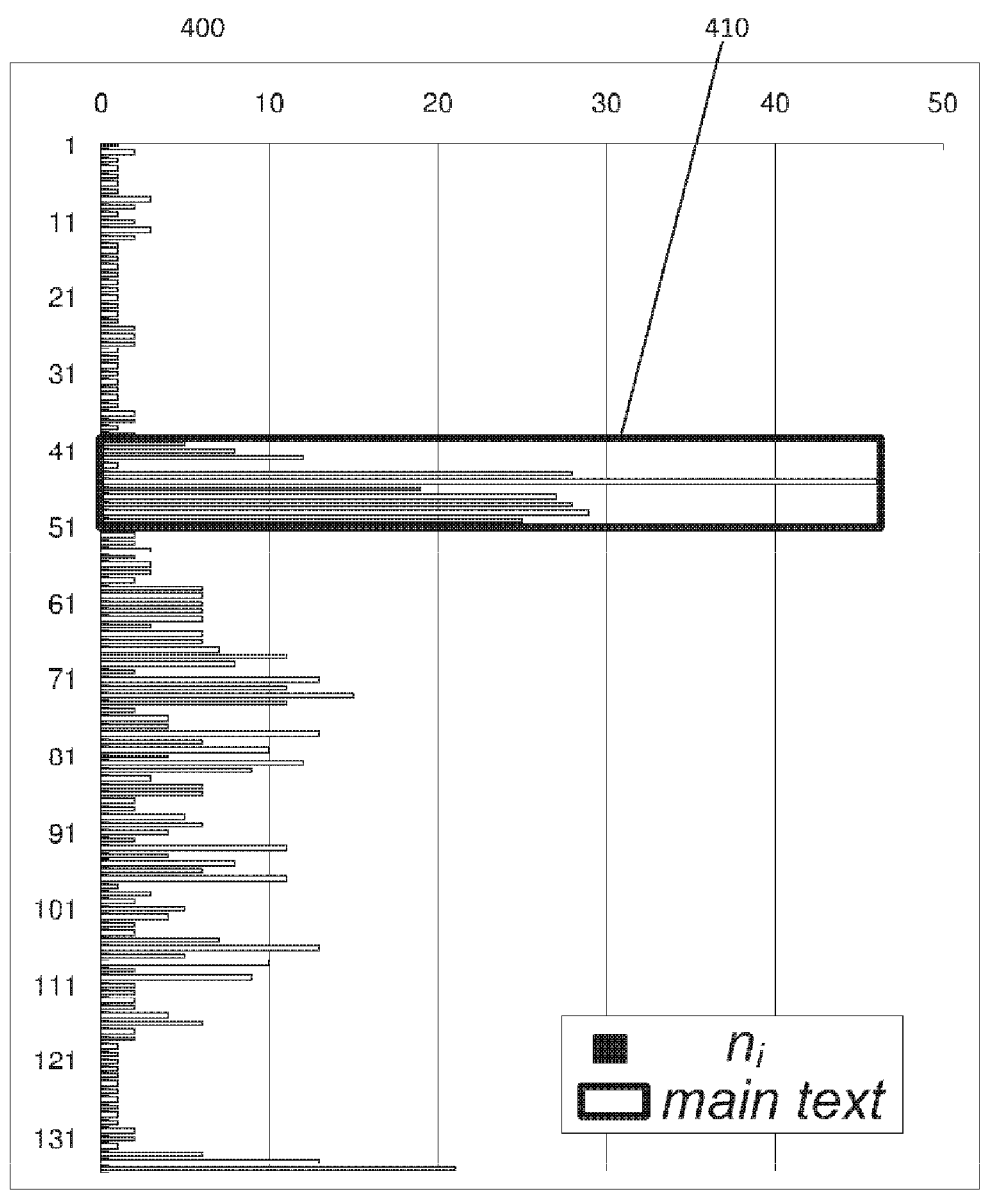
FIG. 4 is a histogram of paragraph length.

The word count for each of the paragraphs $p_i(1 \leq i \leq N)$ is then determined, which is denoted by a positive integer $n_i$ for $1 \leq i \leq N$. FIG. 4 is a histogram 400 representing paragraph length (the value of $n_i$ for $1 \leq i \leq N$) for each of the paragraphs in the document 400. The main text 410 of the document 400 is indicated with a corresponding rectangle in FIG. 4. It is difficult to predetermine a threshold (i.e. select a threshold which applies to all documents) for paragraph length which allows the main text 410 to be determined since paragraph length may vary considerably between documents. For example, paragraph length may depend upon a style of the author, the context of the document, etc. Therefore, in embodiments of the invention, the main text 410 in the document is determined based upon the length of all paragraphs in the document. In particular, the main text 410 is distinguished according to a ratio of each paragraph's length to a length of a longest paragraph in the document. In other words, each paragraph is assigned a length value based upon its length and that of the longest paragraph. In an embodiment of the invention, the length value is a maximum of 1, corresponding to the longest paragraph, although it will be realised that other maximum length values may be used. In some embodiments of the invention, the length values of each paragraph in the document is smoothed based upon a smoothing factor or weight and the length value of adjacent paragraphs, as will be explained.

In order to distinguish the main text 410, in step 260 the paragraph lengths in $n_i$ are normalised to within a range [0, 1] according to a greatest paragraph length in the document by equation 2:

$$n'_i = \frac{n_i}{n_{max}} \qquad \text{Equation 2}$$

wherein $n_{max}$ is the maximum value of $n_i$.

In step 270, the normalised paragraph lengths of $n_i'$ are smoothed to form a set of smoothed paragraph lengths $n_i''$ by equation 3:

$$n_i'' = \begin{cases} \dfrac{w \times n_1' + n_2'}{w+1}, & i=1 \\ \dfrac{n_{i-1}' + w \times n_i' + n_{i+1}'}{1+w+1}, & 1 < i < N \\ \dfrac{n_{N-1}' + w \times n_N'}{1+w}, & i = N \end{cases} \qquad \text{Equation 3}$$

wherein w is a predetermined smoothing weight. A smoothing weight w=2 may be chosen, although other values can be selected.

Equation 3 smoothes the normalised paragraphs lengths based upon weighted bins. A bin contains a plurality of values. First and last paragraphs (i=1 & i=N) are smoothed with reference to a single adjacent paragraph length, whereas intermediate paragraphs are smoothed with reference to the two immediately adjacent paragraphs i.e. preceding and following paragraphs. Each bin, denoted by the value of i is given a weight of 2 during calculation of that bin's value, whereas the one or two adjacent bins are effectively given a weight of 1 in Equation 3.

In step 280 the one or more paragraphs forming the main text 310 of the document 300 are determined. In step 280 two threshold paragraph lengths are determined by Equations 4 and 5:

$$n_{long}'' = \frac{(w' \times n_{max}'' + n_{avg}'')}{(w'+1)} \qquad \text{Equation 4}$$

$$n_{short}'' = \frac{(w' \times n_{min}'' + n_{avg}'')}{(w'+1)} \qquad \text{Equation 5}$$

wherein w is a predetermined weight (w'=2 by default), $n_{avg}''$ is the average value of all $n_i''$, $n_{max}''$ is the maximum value of all $n_i''$ and $n_{min}''$ is the minimum value of all $n_i''$. Let $P'=\{p_k, p_{k+1}, \ldots, p_N\}$ be a continuous subset of P.

It can be determined that P' represents the main text in P if the following two conditions are satisfied:

1) There exists at least one $p_i \in P'$ having a corresponding $n_i'' \geq n_{long}''$; and
2) Every $p_i \in P'$ has a corresponding $n_i'' \geq n_{short}''$.

Figure 5:
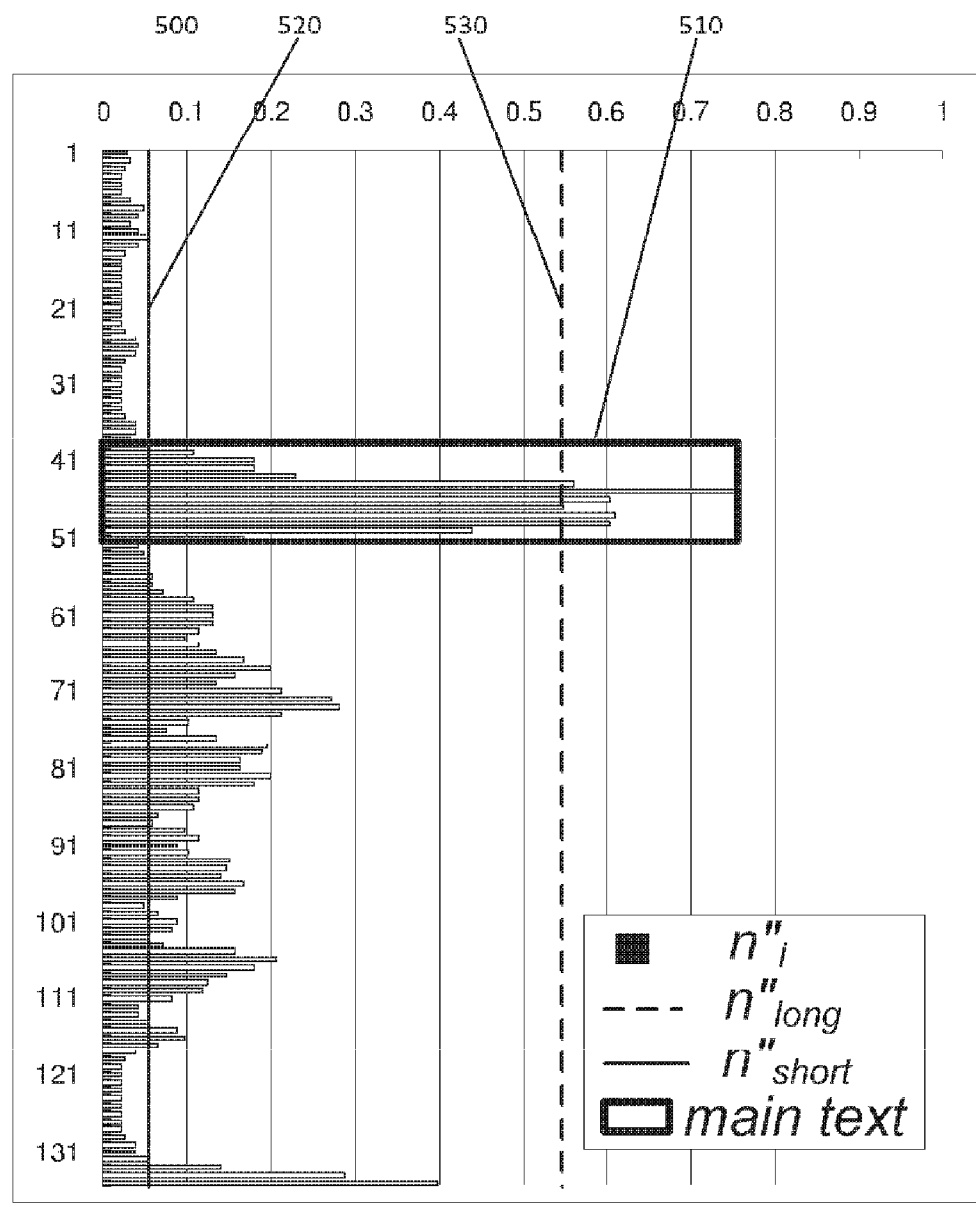
FIG. 5 is a histogram of paragraph length and paragraph length threshold indicators.

FIG. 5 illustrates the normalised and smoothed histogram 500, as shown in FIG. 4, an indication 510 of the paragraphs determined to contain the main text by using Equations 4 and 5, and indications of $n_{long}''$ 520 and $n_{short}''$ 530.

According to Equations 4 and 5, paragraphs 39 to 51 are determined to contain the main text 310 which, although slightly greater than paragraphs 40 to 50, is a good approximation to the main text 310. In particular, a majority of the other text has been removed from the document 300 without omitting any of the main text 310. Whilst in the example illustrated in FIG. 5 only one section of main text is included in the document, it will be realised that step 280 may determine two or more sections of main text utilising the conditions noted above.

The above-described embodiment of the invention determines the main text 310 of a mark-up document 300 when the one or more sections of main text 310 have a similar paragraph length. However, it is sometimes desired to extract a plurality of sections of main text from a mark-up document when the sections of main text have different paragraph lengths. For example, a blog is a mark-up document which includes a plurality of sections of main text which may be written by an author regarding different topics and thus each section is likely to have different paragraph lengths. Similarly, a forum may be a mark-up document containing textual contributions by different authors, wherein paragraph lengths of each author are likely to differ due to their respective writing styles.

Figure 6:
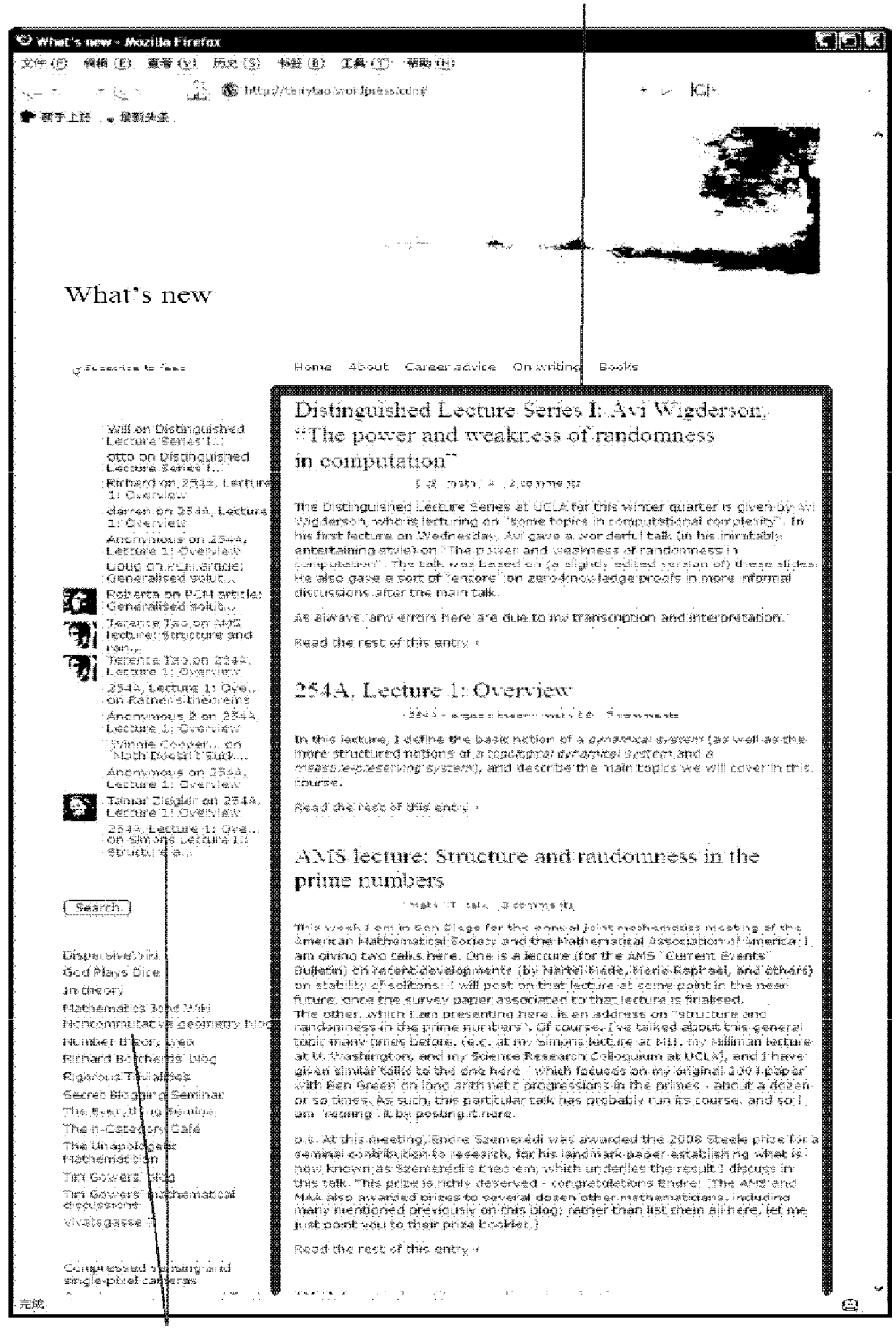
FIG. 6 is an illustration of another web page having a plurality of sections of main text displayed in a web browser.

FIG. 6 is a mark-up document 600 displayed in a browser application, wherein the document 600 includes a plurality of sections of main text 610 and other text 620. In order to identify the plurality of sections of main text 610, in some embodiments of the invention, the method described above is performed iteratively until a predetermined condition is satisfied. As a result of the iterative processing of the mark-up document 600, a plurality of sections of the main text 610 can be determined, even when those sections have differing paragraph lengths.

Figure 7:
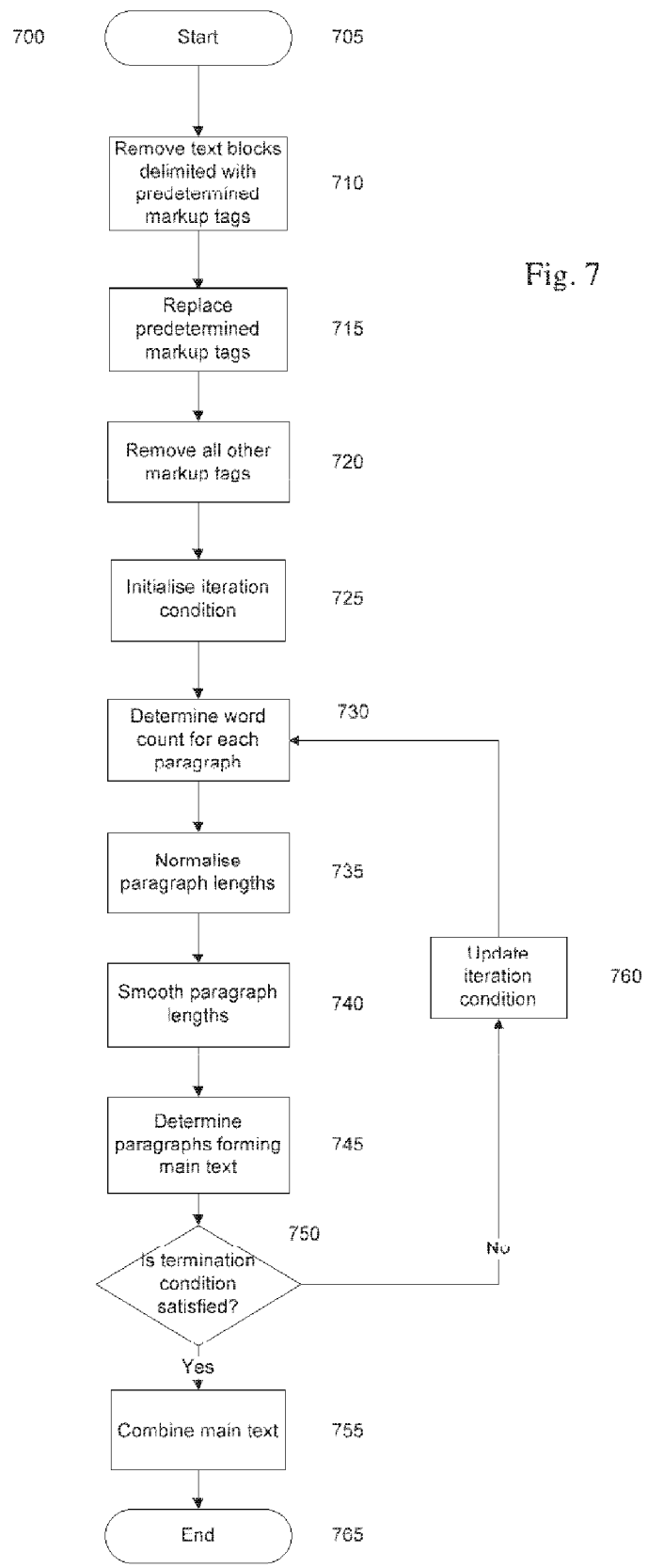
FIG. 7 is an illustration of a method according to an embodiment of the invention.

FIG. 7 illustrates a method 700 according to a further embodiment of the invention. A number of steps forming the method shown in FIG. 7 are identical to those described with respect to FIG. 2. Further discussion of these steps at this point will be omitted for clarity. Instead the reader is directed to the description associated with FIG. 2, where appropriate.

Figure 8:
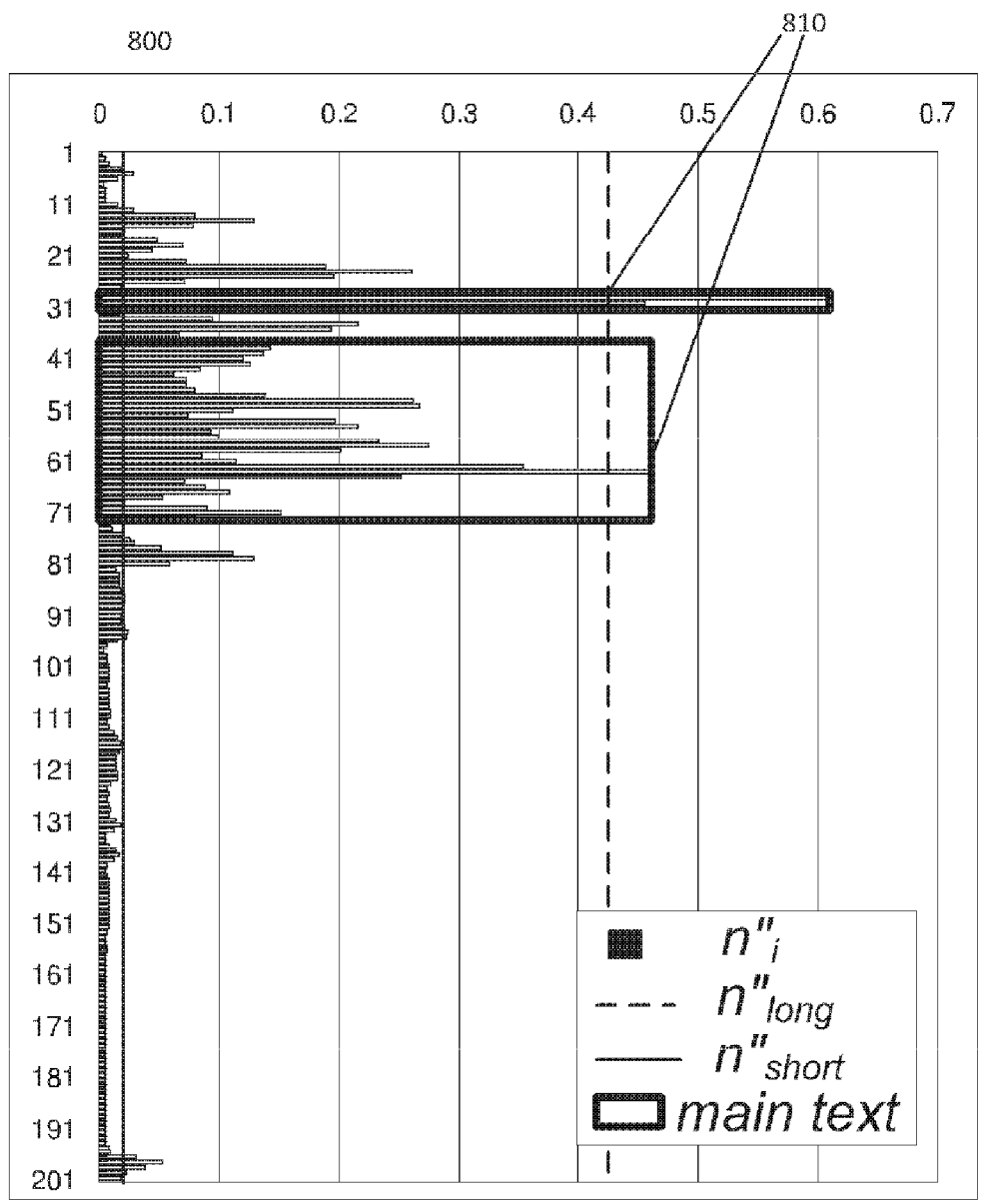
FIG. 8 is a histogram of paragraph length and paragraph length threshold indicators during a first iteration of a method according to an embodiment of the invention.
Figure 9:
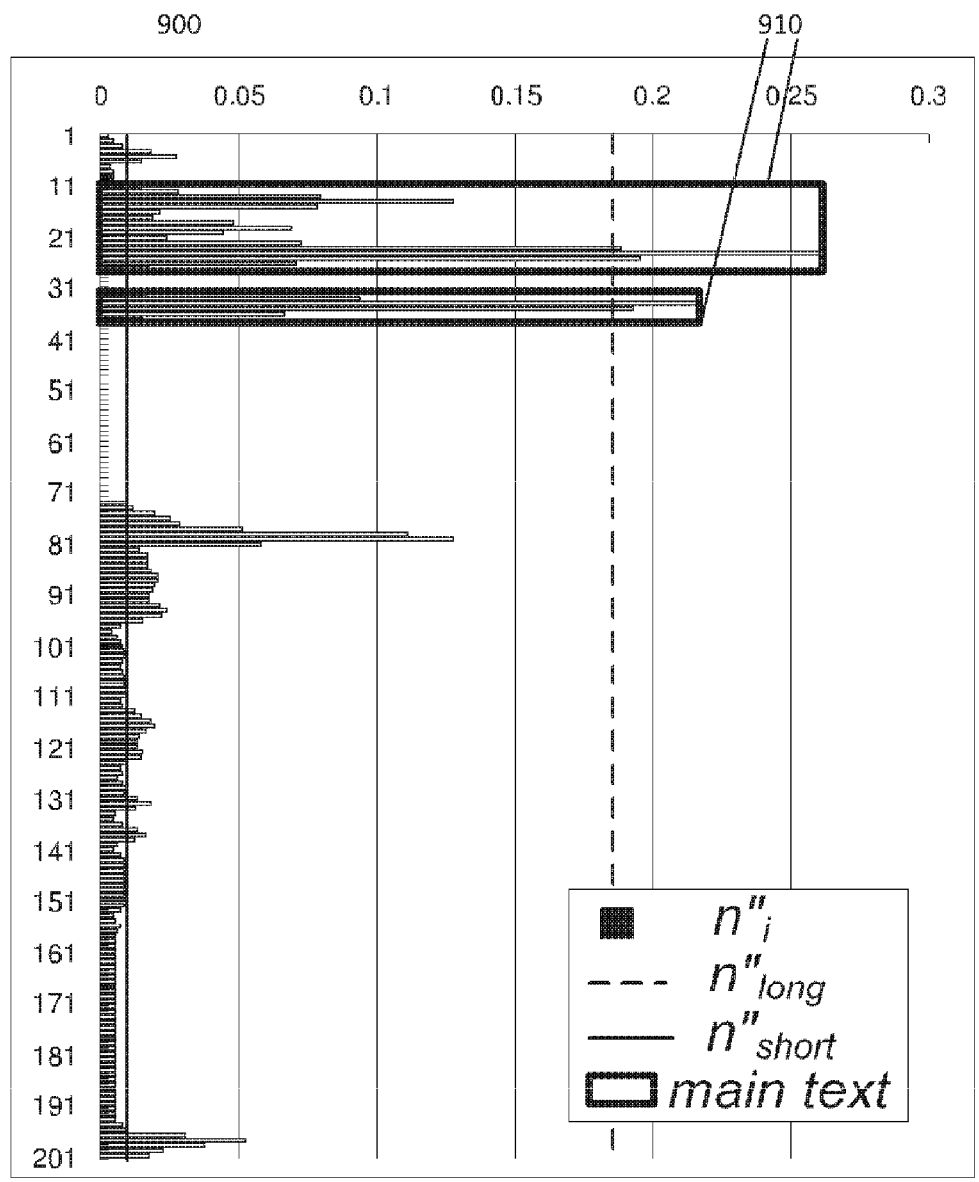
FIG. 9 is a histogram of paragraph length and paragraph length threshold indicators during a second iteration of the method according to an embodiment of the invention.
Figure 10:
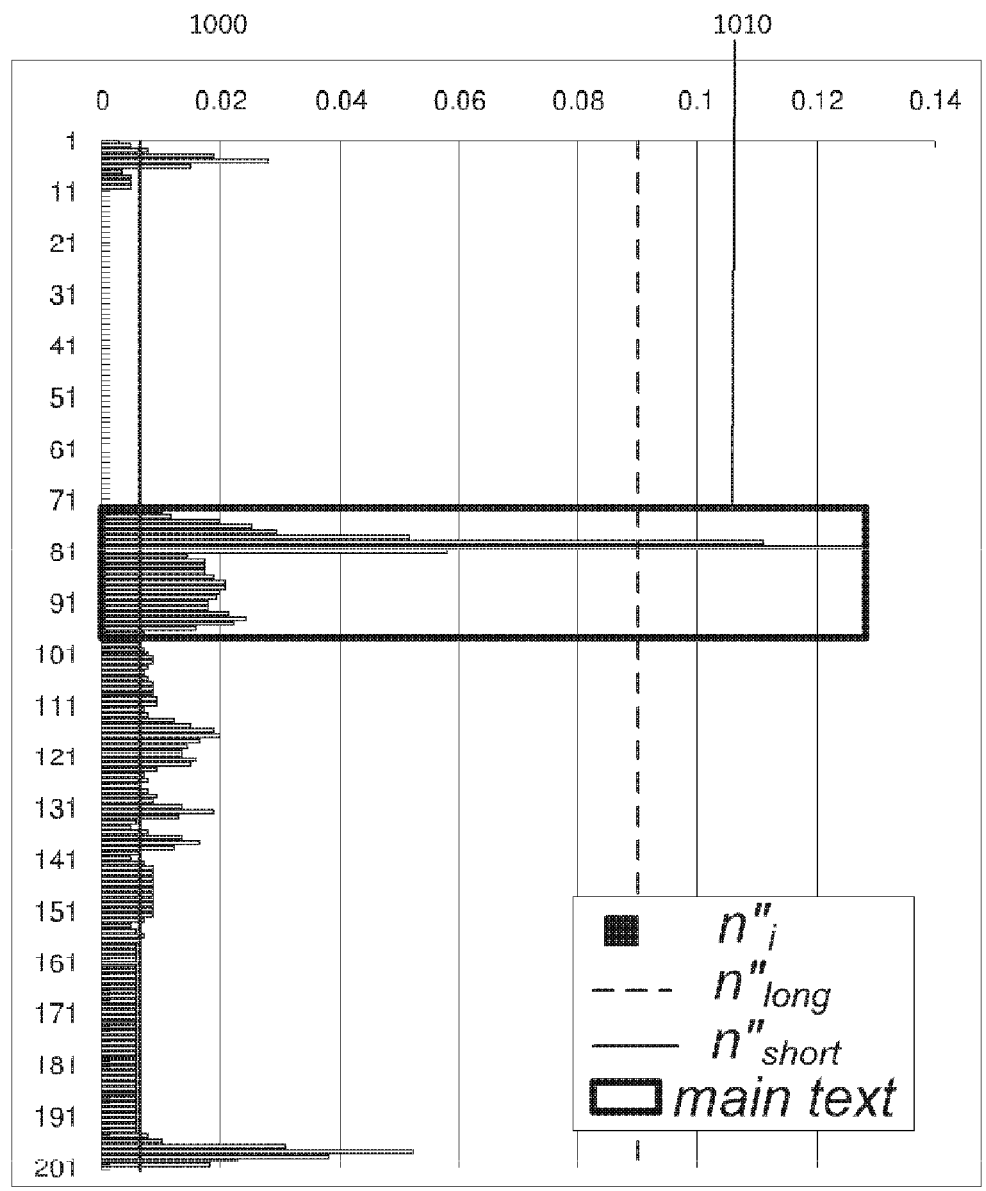
FIG. 10 is a histogram of paragraph length and paragraph length threshold indicators during a third iteration of the method according to an embodiment of the invention.
Figure 11:
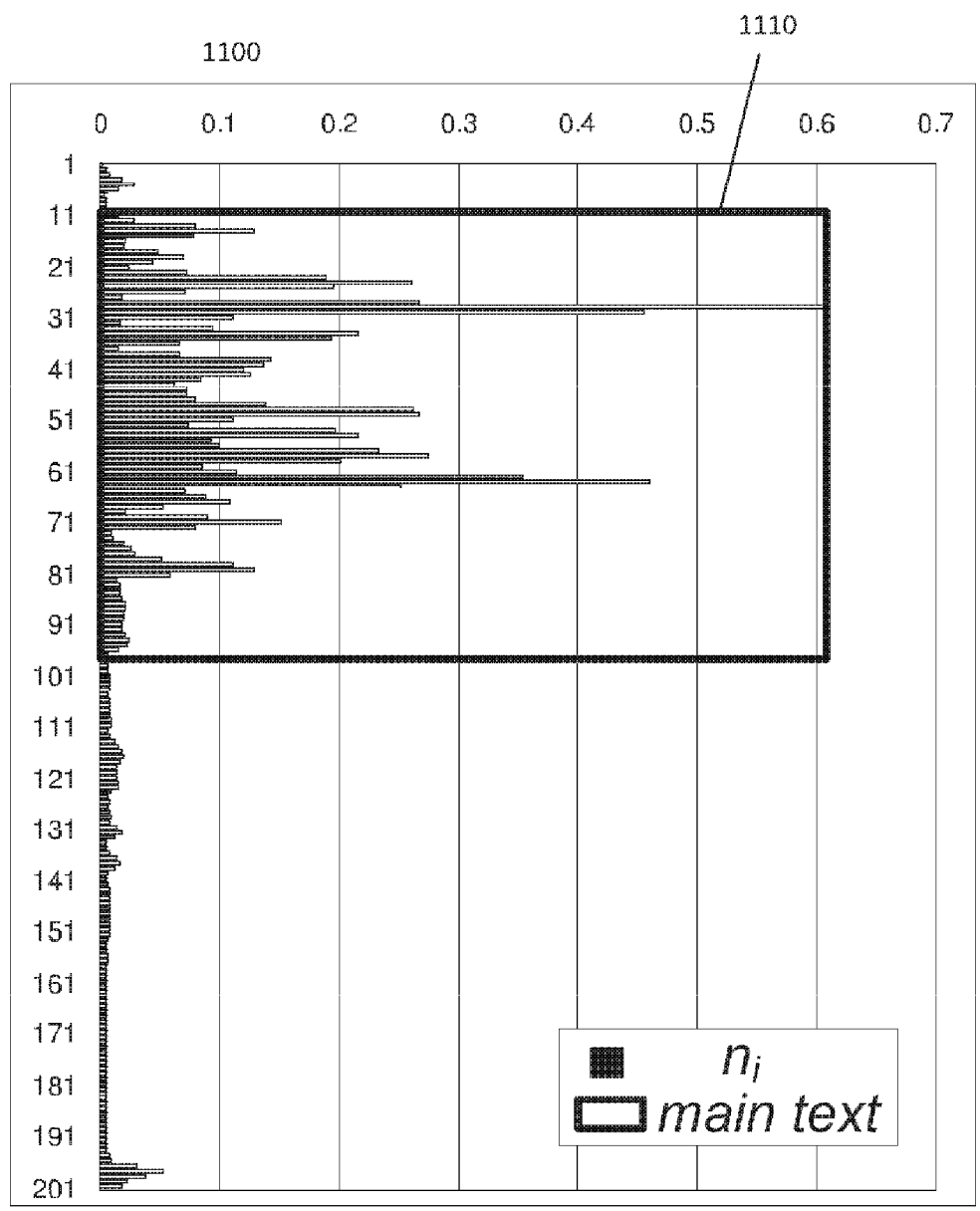
FIG. 11 is a histogram of paragraph length and an indication of main text determined by the method according to an embodiment of the invention.

The method 700 begins in step 705. In step 710 text delimited with pairs of predetermined mark-up tags is removed, as in step 220 shown in FIG. 2. In step 715, predetermined mark-up tags of a mark-up document are replaced with carriage returns (CRs) and in step 720 other mark-up tags are removed, as in steps 230 and 240 described with reference to FIG. 2. In step 725 an iteration condition is initialised. In some embodiments of the invention, the iteration condition is a counter storing an iteration number t which is initialised to a predetermined value, for example t=1. It will be realised that other values may be used. In steps 730-745 operations of determining a word count of each paragraph forming the document, determining a word count of each paragraph, normalising paragraph lengths and determining one or more paragraphs forming the main text 610 of the document are performed, as previously described with reference to steps 250-280 of FIG. 2. As a result, as shown in FIG. 8 which is a histogram 800 of paragraph lengths during the first iteration, one or more sections of first main text 810 are determined with respect to first paragraph length thresholds $n_{long}$" and $n_{short}$". The paragraphs determined to form the first main text 810 are removed from the document for consideration in any future iterations. The removed first main text 810 may be stored in a storage device such as a memory. In step 750, it is determined whether a termination condition is satisfied. The termination condition may be a predetermined number of iterations e.g. whether i=t=3. If the termination condition is not satisfied then processing moves to step 760 where the iteration condition is updated i.e. incremented by 1. Processing then returns to step 730 wherein a word count for each remaining paragraph in the document is determined, excluding the previously determined main text 810. Steps 735-745 are then performed, wherein in step 745 second main text 910 is determined, as shown in FIG. 9 which is a histogram of paragraph lengths of the remaining text 900 and second paragraph length thresholds $n_{long}$" and $n_{short}$". In step 750 it is determined whether the termination condition is satisfied i.e. whether i=t. If the termination condition is satisfied, processing moves to step 755, wherein the previously determined paragraphs of main text 81, 910 are combined. However, in the present example, the termination condition is not satisfied after the second iteration, so the second main text 910 is stored in memory and removed from the document. Processing then moves to step 760 wherein the iteration condition is updated i.e. i is incremented. Step 730 to 745 are then repeated for the remaining paragraphs to determine third main text 1010, as shown in FIG. 10 which is a histogram 1000 of the lengths of the remaining paragraphs and third paragraph length thresholds $n_{long}$" and $n_{short}$". In step 750 the termination condition is satisfied on the third iteration i.e. i=t=3, therefore processing moves to step 755 wherein the first 810, second 910 and third 101 main text paragraphs are combined to form the total main text 1110 of the document, as shown in FIG. 11 which is a histogram 1100 of all paragraph lengths in the document. In some embodiments, rather than a predetermined iteration number t, the termination condition may be (1) the current vertical thresholds ($n_{long}$" and $n_{short}$") being less than predetermined values; (2) the ratio of the rest of the text to the original text is less than a predefined value, such as 20%; or (3) the combination of conditions mentioned above.

In the example described with reference to FIGS. 6 and 8-11 after three iterations five sections of main text had been determined (two in the first two iterations and one in the third iteration). The total main text of the example mark-up document is determined to be paragraphs 11 to 97, whereas the actual main text contained in the mark-up document was paragraphs 12 to 80. Whilst not every paragraph of other text has been removed, all paragraphs of main text 810, 910, 1010 have been identified and a majority of the other text removed.

Figure 12:
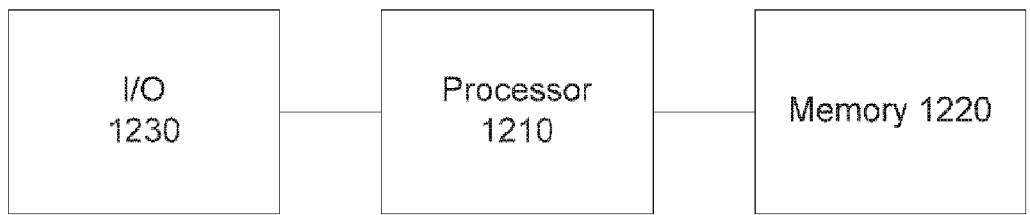
FIG. 12 is a schematic illustration of an apparatus according to an embodiment of the invention.

FIG. 12 shows a schematic illustration of an apparatus 1200 for determining the main text 110 of a mark-up document 100 according to an embodiment of the invention.

The apparatus 1200 comprises a processor 1210 for executing software instructions, the processor 1210 being communicatively coupled to a memory 1220 for storing data therein and an I/O device 1230 for transmitting/receiving data. The processor 1210 is arranged to receive a mark-up document 100 via the I/O device 1230 and to store the mark-up document in the memory 1220. The processor is operatively arranged to determine one or more paragraphs of main text 110 in the mark-up document 100 according to embodiments of the invention as described above.

Advantageously, embodiments of the present invention provide a means for quickly identifying main text of a mark-up document. Embodiments of the present invention achieve good accuracy in identifying main text within a mark-up document, even when the mark-up document contains a plurality of different sections of main text of varying paragraph lengths.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method of determining main text in a mark-up document, comprising:
 removing, by a system having a processor, first predetermined mark-up tags from the mark-up document, and replacing second predetermined mark-up tags in the mark-up document with separation elements, wherein the removing and the replacing cause the mark-up document to contain text paragraphs and the separation elements without the first and second predetermined mark-up tags;

determining, by the system, a length of each of the text paragraphs in the mark-up document; and determining, by the system, one or more main paragraphs of the mark-up document based upon the lengths of the text paragraphs in the mark-up document.

2. The method of claim 1, further comprising:

normalizing the lengths of the text paragraphs in the mark-up document with respect to a length of a longest text paragraph in the mark-up document, wherein determining the one or more main paragraphs is based on the normalized lengths of the text paragraphs.

3. The method of claim 2, wherein the lengths of the text paragraphs are normalized according to the equation:

$$n'_i = \frac{n_i}{n_{max}}$$

wherein $n'_i$ is a normalized length of a text paragraph, $n_i$ is a length of a text paragraph, $1 \leq i \leq N$ is a number of a last text paragraph in the mark-up document, and $n_{max}$ is the length of the longest text paragraph in the mark-up document.

4. The method of claim 1, comprising:

smoothing the lengths of the text paragraphs in the mark-up document based upon one or more adjacent text paragraph lengths, wherein determining the one or more main paragraphs is based on the smoothed lengths.

5. The method of claim 4, wherein the lengths of the text paragraphs are smoothed according to the equation:

$$n''_i = \begin{cases} \frac{w \times n'_1 + n'_2}{w+1}, & i = 1 \\ \frac{n'_{i-1} + w \times n'_i + n'_{i+1}}{1+w+1}, & 1 < i < N \\ \frac{n'_{N-1} + w \times n'_N}{1+w}, & i = N \end{cases}$$

wherein $n''_i$ is a smoothed length of a text paragraph, $n_i$ is a length of a text paragraph, and w is a predetermined smoothing weight.

6. The method of claim 1, wherein the replacing comprises replacing the second predetermined mark-up tags in the mark-up document with line breaks.

7. The method of claim 1, wherein the replacing comprises replacing the second predetermined mark-up tags with carriage returns.

8. The method of claim 1, comprising:

determining first main paragraphs of the mark-up document based upon the lengths of the text paragraphs in the mark-up document;

discarding from consideration the first main paragraphs of the mark-up document and determining second main paragraphs of the mark-up document based upon the lengths of the text paragraphs remaining in the mark-up document.

9. The method of claim 8, further comprising combining the first and second main paragraphs as the main paragraphs of the mark-up document.

10. An apparatus for determining main text in a mark-up document, comprising:

a memory having a mark-up document stored therein; and a processor configured to:

remove first predetermined mark-up tags from the mark-up document, and replace second predetermined mark-up tags in the mark-up document with separation elements, wherein the removing and the replacing cause the mark-up document to contain text paragraphs and the separation elements without the first and second predetermined mark-up tags;

determine lengths of the text paragraphs in the mark-up document; and determine one or more main paragraphs of the mark-up document based upon the lengths of the text paragraphs in the mark-up document.

11. The apparatus of claim 10, wherein the processor is configured to further compute a paragraph length threshold based upon the lengths of the text paragraphs in the mark-up document, and wherein the determining of the one or more main paragraphs is further according to the paragraph length threshold.

12. The apparatus of claim 10, wherein the processor is configured to further normalize the lengths of the text paragraphs in the mark-up document with respect to a length of a longest text paragraph in the mark-up document, wherein the determining of the one or more main paragraphs is based on the normalized lengths of the text paragraphs.

13. A non-transitory computer-readable storage medium storing instructions that upon execution cause a system to:

remove first predetermined mark-up tags from the mark-up document, and replacing second predetermined mark-up tags in the mark-up document with separation elements, wherein the removing and the replacing cause the mark-up document to contain text paragraphs and the separation elements without the first and second predetermined mark-up tags;

determine a length of each of the text paragraphs in the mark-up document; and determine one or more main paragraphs of the mark-up document based upon the lengths of the text paragraphs in the mark-up document.

14. The non-transitory computer-readable storage medium of claim 13, wherein the instructions upon execution cause the system to further:

normalize the lengths of the text paragraphs in the mark-up document with respect to a length of a longest text paragraph in the mark-up document, wherein determining the one or more main paragraphs is based on the normalized lengths of the text paragraphs.

15. The non-transitory computer-readable storage medium of claim 14, wherein the lengths of the text paragraphs are normalized according to the equation:

$$n'_i = \frac{n_i}{n_{max}}$$

wherein $n'_i$ is a normalized length of a text paragraph, $n_i$ is a length of a text paragraph, $1 \leq i \leq N$ is a number of a last text paragraph in the mark-up document, and $n_{max}$ is the length of the longest text paragraph in the mark-up document.

16. The non-transitory computer-readable storage medium of claim 13, wherein the instructions upon execution cause the system to further:

smooth the lengths of the text paragraphs in the mark-up document based upon one or more adjacent text paragraph lengths, wherein determining the one or more main paragraphs is based on the smoothed lengths.

17. The non-transitory computer-readable storage medium of claim 13, wherein the replacing comprises replacing the second predetermined mark-up tags in the mark-up document with line breaks.

18. The non-transitory computer-readable storage medium of claim 13, wherein the replacing comprises replacing the second predetermined mark-up tags with carriage returns.

19. The non-transitory computer-readable storage medium of claim 13, wherein the instructions upon execution cause the system to further:
   determine first main paragraphs of the mark-up document based upon the lengths of the text paragraphs in the mark-up document;
   discard from consideration the first main paragraphs of the mark-up document and determining second main paragraphs of the mark-up document based upon the lengths of the text paragraphs remaining in the mark-up document.

20. The non-transitory computer-readable storage medium of claim 19, wherein the instructions upon execution cause the system to further combine the first and second main paragraphs as the main paragraphs of the mark-up document.

21. The non-transitory computer-readable storage medium of claim 13, wherein the instructions upon execution cause the system to further compute a paragraph length threshold based upon the lengths of the text paragraphs in the mark-up document, and wherein the determining of the one or more main paragraphs is further according to the paragraph length threshold.

\* \* \* \* \*